US008640353B2

(12) United States Patent
Burton

(10) Patent No.: US 8,640,353 B2
(45) Date of Patent: Feb. 4, 2014

(54) RIDE HEIGHT GAUGE FOR RC CARS

(76) Inventor: Harold Michael Burton, Warwick, NY (US)

( * ) Notice: Subject to any disclaimer, the term of this patent is extended or adjusted under 35 U.S.C. 154(b) by 263 days.

(21) Appl. No.: 13/286,704

(22) Filed: Nov. 1, 2011

(65) Prior Publication Data
US 2012/0137760 A1 Jun. 7, 2012

Related U.S. Application Data

(60) Provisional application No. 61/408,707, filed on Nov. 1, 2010.

(51) Int. Cl.
*G01B 5/25* (2006.01)
*G01D 21/00* (2006.01)

(52) U.S. Cl.
USPC .............................................. 33/600; 33/608

(58) Field of Classification Search
USPC .................. 33/203.15, 288, 533, 600, 608
See application file for complete search history.

(56) References Cited

U.S. PATENT DOCUMENTS

| | | | | |
|---|---|---|---|---|
| 5,054,207 A | * | 10/1991 | Marshall | 33/600 |
| 5,369,602 A | * | 11/1994 | Naas et al. | 33/600 |
| 5,515,613 A | * | 5/1996 | Hinson | 33/608 |
| 5,909,940 A | * | 6/1999 | Baldock | 33/608 |
| 6,314,657 B2 | * | 11/2001 | Kroll et al. | 33/600 |
| 7,331,211 B2 | * | 2/2008 | Harrill | 33/288 |
| 2005/0115088 A1 | * | 6/2005 | Paulsen et al. | 33/203.18 |
| 2011/0113640 A1 | * | 5/2011 | Molina | 33/608 |
| 2012/0110867 A1 | * | 5/2012 | Molina | 33/608 |

OTHER PUBLICATIONS

Hudy, About Us, http://www.hudy.net/xhudy/other/about_us.php, retrieved on Aug. 26, 2010 (1 page).
Hudy, Products, Set-up Systems, http://www.hudy.net/xhudy/products/product_main.php?kategoria=64, retrieved on Aug. 26, 2010 (12 pages).
Hudy, Ultimate Professional R/C Products, http://www.hudy.net/flash_stuff/all_in/index.htm, retrieved on Aug. 26, 2010 (28 pages).
A Main Hobbies, Hudy 17mm-30mm Off-Road Chassis Ride Height Gauge (1/8 & 1/10), http://www.amainhobbies.com/product_info.php/cPath/89_254/products_id/173513/n/Hudy-17mm-30mm-Off-Road-Chassis-Ride-Height-Gauge-1-8-1-10, retrieved on Mar. 12, 2012 (2 pages).
A Main Hobbies, Losi Ride Height Gauge [LOSA991731], http://www.amainhobbies.com/product_info.php/cPath/89_254/products_id/33582/n/Team-Losi-Ride-Height-Gauge, retrieved on Mar. 12, 2012 (2 pages).

(Continued)

*Primary Examiner* — G. Bradley Bennett
(74) *Attorney, Agent, or Firm* — Wood, Herron & Evans, LLP

(57) ABSTRACT

A ride height gauge includes a chassis engaging member biased relative to a base member via springs. Lowering an RC car chassis onto the chassis engaging member causes the chassis engaging member to lower until the car's wheels touch a support surface on either side of the base member. The chassis engaging member's lowered position is displayed on measurement columns that measure the height of the chassis engaging member from the support surface, which can be used to determine the ride height of the vehicle. The measurement columns at opposite ends of the vehicle allow the user to simultaneously measure the ride height at either end of the vehicle without repositioning of the vehicle.

14 Claims, 4 Drawing Sheets

(56) References Cited

OTHER PUBLICATIONS

A Main Hobbies, Muchmore Racing Luxury Aluminum Ride Height Gauge (Black) [MMRMRHGK], http://www.amainhobbies.com/product_info.php/cPath/89_254/products_id/153377/n/Muchmore-Racing-Luxury-Aluminum-Ride-Height-Gauge-Black, retrieved on Mar. 12, 2012 (2 pages).

A Main Hobbies, Products Found, http://www.amainhobbies.com/advanced_search_result.php?keywords=ride+height+gauge, retrieved on Aug. 26, 2010 (3 pages).

A Main Hobbies, RC Cars and Trucks, RC Helicopters and Planes, http://www.amainhobbies.com, retrieved on Aug. 26, 2010 (3 pages).

\* cited by examiner

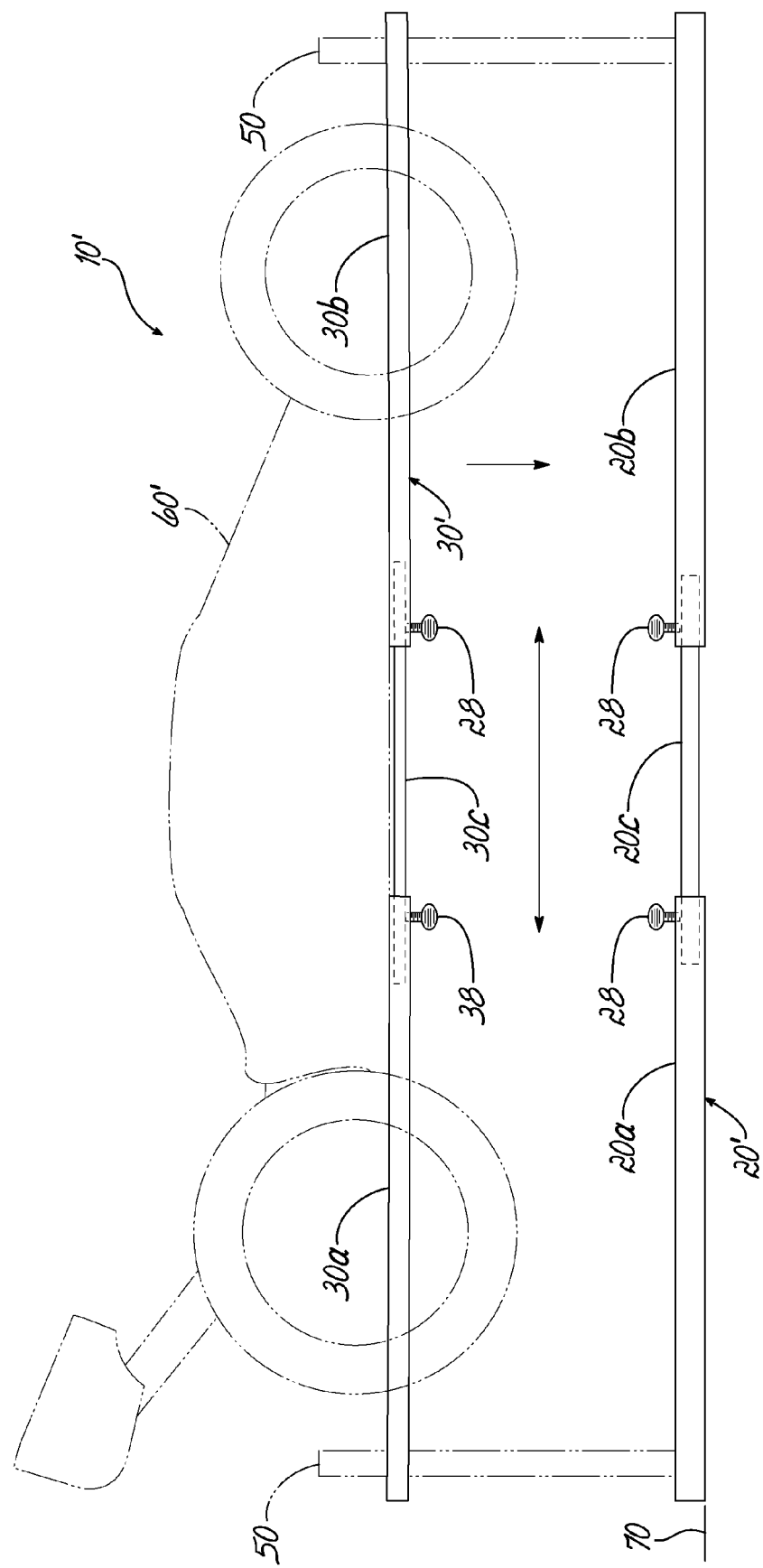

RIDE HEIGHT GAUGE FOR RC CARS

CROSS-REFERENCE TO RELATED APPLICATION

This application claims the filing date benefit of U.S. Provisional Application No. 61/408,707, filed Nov. 1, 2010, the disclosure of which is hereby incorporated by reference herein in its entirety.

FIELD OF THE INVENTION

The invention relates generally to radio controlled vehicles and, more particularly, to adjustment devices for adjusting the suspension of a wheeled vehicle.

BACKGROUND OF THE INVENTION

Radio controlled ("RC") vehicles are a popular and sophisticated hobby. RC cars often operate under a variety of conditions, and hobbyists can adjust various aspects of their vehicle to improve speed and handling under each of those conditions. Adjusting various aspects of the vehicle's suspension in order to improve performance is a well-known and widely enjoyed feature of the hobby.

One aspect of the vehicle's suspension that is often adjusted to tune handling is the vehicle's ride height, defined as the distance between the bottom of the vehicle's chassis and the surface supporting the vehicle. Ride height can have a significant impact on vehicle handling and performance. A vehicle that sits low will generally experience less chassis roll and have more even weight distribution of the wheels, which can improve turning and general handling. A vehicle that sits high will generally experience more chassis roll and distribute weight selectively, which can improve traction. Right height may also affect a vehicle's ability to deal with uneven, off-road environments and track obstacles.

Because vehicle ride height is often tailored to track conditions, it is important to be able to quickly and conveniently measure ride height as part of tuning the vehicle. Existing ride height gauges exist in the form of stepped gauges, wherein one end of the chassis is moved across the steps until it no longer clears a step, thus determining its approximate height on that end of the chassis. The chassis can then be removed and the gauge used with the other end of the chassis to determine the height of that end. Existing ride height gauges are also sold in the form of a hand-held gauge that can be placed under a single point in the chassis to measure the distance between that point and the support surface.

There is a need for a ride height gauge that more conveniently measures the height of both ends of the chassis, that does so quickly and conveniently, and that can easily display the ride height for all kinds of wheeled RC vehicles without any particular calibration.

SUMMARY OF THE INVENTION

The present invention overcomes the foregoing and other shortcomings and drawbacks of adjustment devices for adjusting the suspension of a wheeled vehicle. While the invention will be described in connection with certain embodiments, it will be understood that the invention is not limited to these embodiments. On the contrary, the invention includes all alternatives, modifications and equivalents as may be included within the spirit and scope of the present invention.

In one embodiment, a ride height gauge for a model vehicle includes a base member configured to engage a horizontal support surface and a chassis engaging member resiliently biased with respect to the base member and configured to move vertically relative to the base member. In one embodiment, each of the base member and the chassis engaging member comprises a respective plate. A model vehicle placed upon the chassis engaging member, with the chassis of the model vehicle engaging the chassis engaging member, will lower the chassis engaging member to a position above the horizontal support surface approximately equal to the ride height of the model vehicle.

In another embodiment, a ride height gauge for a model vehicle includes a base member configured to engage a horizontal support surface, spring columns and measurement columns extended vertically from the base member and a chassis engaging member having apertures for receiving the spring columns and the measurement columns therethrough. Each spring column comprises a resilient member resiliently biasing the chassis engaging member relative to the base member. A model vehicle placed upon the chassis engaging member, with the chassis of the model vehicle engaging the chassis engaging member, will lower the chassis engaging member until the wheels of the model vehicle contact with the horizontal support surface and each of the measurement columns will display a height measurement which allows the user to determine a ride height (or multiple ride heights) for the vehicle.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 5 is a side plan view of the ride height gauge of FIG. 4 shown expanded.

DETAILED DESCRIPTION OF THE INVENTION

Figure 1:
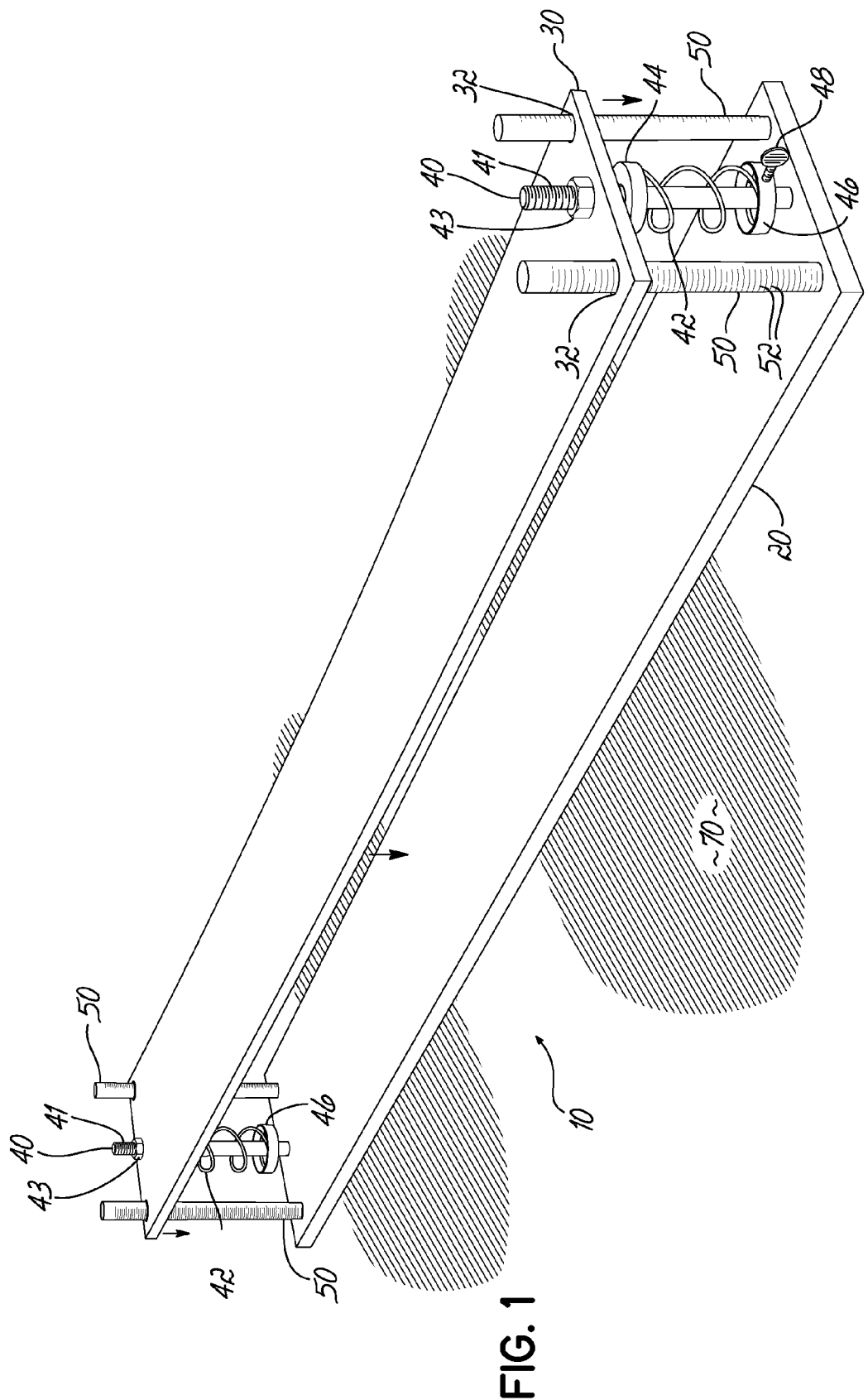
FIG. 1 is perspective view of a ride height gauge in accordance with one embodiment of the present invention.

As shown in FIG. 1, a full-body ride height gauge 10 in accordance with one embodiment includes a base member 20, a chassis engaging member 30, spring columns 40 and measurement columns 50 operatively coupled together to form the ride height gauge 10. In one embodiment, each of the base member 20 and the chassis engaging member 30 comprises a respective plate as shown in the figures. It will be appreciated, however, that other structures or configurations of the base member 20 and chassis engaging member 30 are possible as well without departing from the spirit and scope of the present invention.

Each of the spring columns 40 and the measurement columns 50 may be fixedly attached to the base member 20. The columns 40, 50 may be permanently affixed to the base member 20, or they may be removably affixed for convenient storage of the ride height gauge 10 when not in use.

The measurement columns 50 include indicia 52 convenient for measuring distance. The indicia may measure fractions of an inch, millimeters, or any other length unit appropriate for measuring a height from a surface 70 supporting the ride height gauge 10. In one embodiment, the indicia 52 may be positioned to take into account the total height from the support surface 70, including the height of the base member 20. The indicia 52 may instead show the height from the top of the base member 20, or may mark intervals of distance without marking an absolute distance from any set point. Where the measurement columns 50 readily detach from the base member 20, different measurement columns with different indicia may be provided in accordance with the preferences of the user. The measurement columns 50 may even allow for custom marks to be made by a user to denote one or more preferred height values.

In the exemplary embodiment, the chassis engaging member 30 includes apertures 32 positioned to receive the spring columns 40 and measurement columns 50 therethrough. While the position of the columns 40, 50 may act to keep the chassis engaging member 30 mainly parallel to the base member 20, the apertures 32 may be sized to be significantly greater in diameter than the columns 40, 50 so that the chassis engaging member 30 can deviate significantly from level when appropriate. In one embodiment, one or more levels (not shown) may be included upon the chassis engaging member 30 to provide additional indication as to whether or not the chassis engaging member 30 is level. Each column 40 may include threads 41 and a limiting member, such as a nut 43, which prevents the chassis engaging member 30 from traveling off of the columns 40, 50.

Sometimes an uneven ride height is desirable. For example, in some vehicles, the front and rear suspensions are tuned to have the front and rear ends of the chassis at different heights to improve handling. Since the chassis engaging member 30 can deviate significantly from level, the front and rear measurement columns 50 allow the user to measure different front and rear ride heights when the vehicle is placed upon the gauge without having to reposition the vehicle to make additional measurements.

In the exemplary embodiment, each spring column 40 may include a spring 42 attached to two spring cradles 44, 46. The upper spring cradle 44 moves freely in the vertical direction along the column 40, while the lower spring cradle 46 includes a means to securely fasten it to a set location along the height of the column 40. As shown, the means may be a wing fastener 48 that engages the column 40 when tightened. A wing fastener 48 or other suitable means may allow for adjustment of the location that the lower cradle 46 fastens to the column 40. Alternatively, the lower cradle 46 may be permanently affixed to a set position on the spring column 40, such as through a weld or adhesive attachment, or the use of a screw or other fastener in a single drilled hole or other positioned feature in the column (not shown).

Although shown as compression coil springs, any resilient member may be used to resiliently bias the chassis engaging member 30 relative to the base member 20. In the illustrated embodiment, each spring 42 is a coil compression spring with a weak spring constant, such that the force that it exerts is sufficient to bias the chassis engaging member 30 away from the base member 20 to elevate the chassis engaging member 30 to a height above the expected maximum ride height of a vehicle to be measured, but not sufficient to impede an accurate ride height measurement near the minimum expected ride height of the vehicle when the vehicle rests upon the chassis engaging member 30 as described in detail below. The adjustable lower spring cradle 46 may aid in placing the spring 42 within the correct height range for a given vehicle. A lower force constant for the spring 42 reflects a longer operable range.

While in the exemplary embodiment the springs 42 are shown and described as being located between the base member 20 and the chassis engaging member 30 to bias the chassis engaging member 30 away from the base member 20, it is contemplated in an alternative embodiment that the springs 42 may comprise extension springs located above the chassis engaging member 30 to likewise bias the chassis engaging member 30 away from the base member 20.

The width of the chassis engaging member 30 is less than the width of an RC vehicle chassis, such that the underside of an RC vehicle 60 to be measured can rest on the chassis engaging member 30 with its wheels protruding from either side. The base member 20, which may be the same width as the chassis engaging member 30, is also narrow enough to allow the wheels of the vehicle 60 to pass unhindered to the surface upon which the gauge 10 rests. The vehicle 60 depresses the chassis engaging member 30 until its wheels touch the surface. The distance between the underside of the vehicle chassis and the support surface is shown by the chassis engaging member 30 intersecting the indicia 52 on the measurement columns 50, thereby allowing simultaneous measurement of the front and rear ride heights of the model vehicle.

Figure 2:
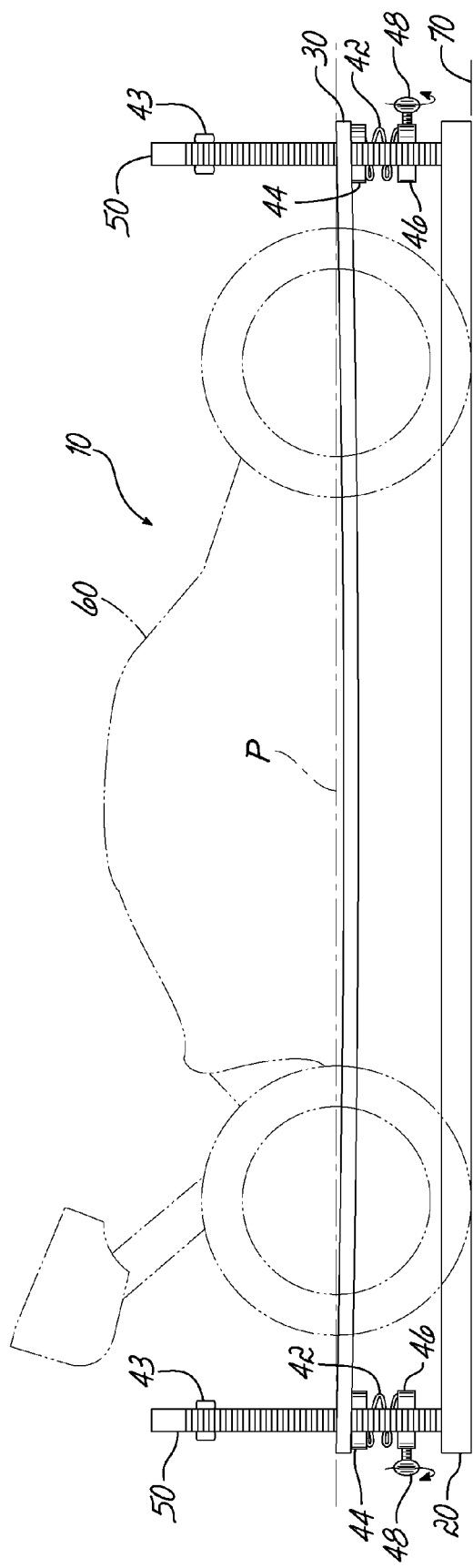
FIG. 2 is a side plan view of the gauge shown in FIG. 1.
Figure 3:
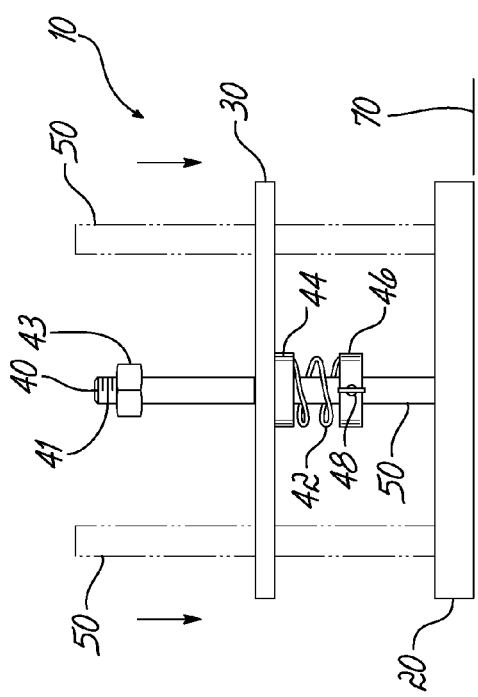
FIG. 3 is an end plan view of the gauge shown in FIGS. 1 and 2.

As shown in FIG. 2 (and again in FIG. 4), the chassis engaging member 30 may be flexible to accommodate a vehicle chassis underside that is slightly lower in the middle than on either end. The chassis engaging member 30 is shown bending slightly below plane P in the center to demonstrate this flexibility in the chassis engaging member 30 if necessary to accommodate the vehicle chassis.

Figure 4:
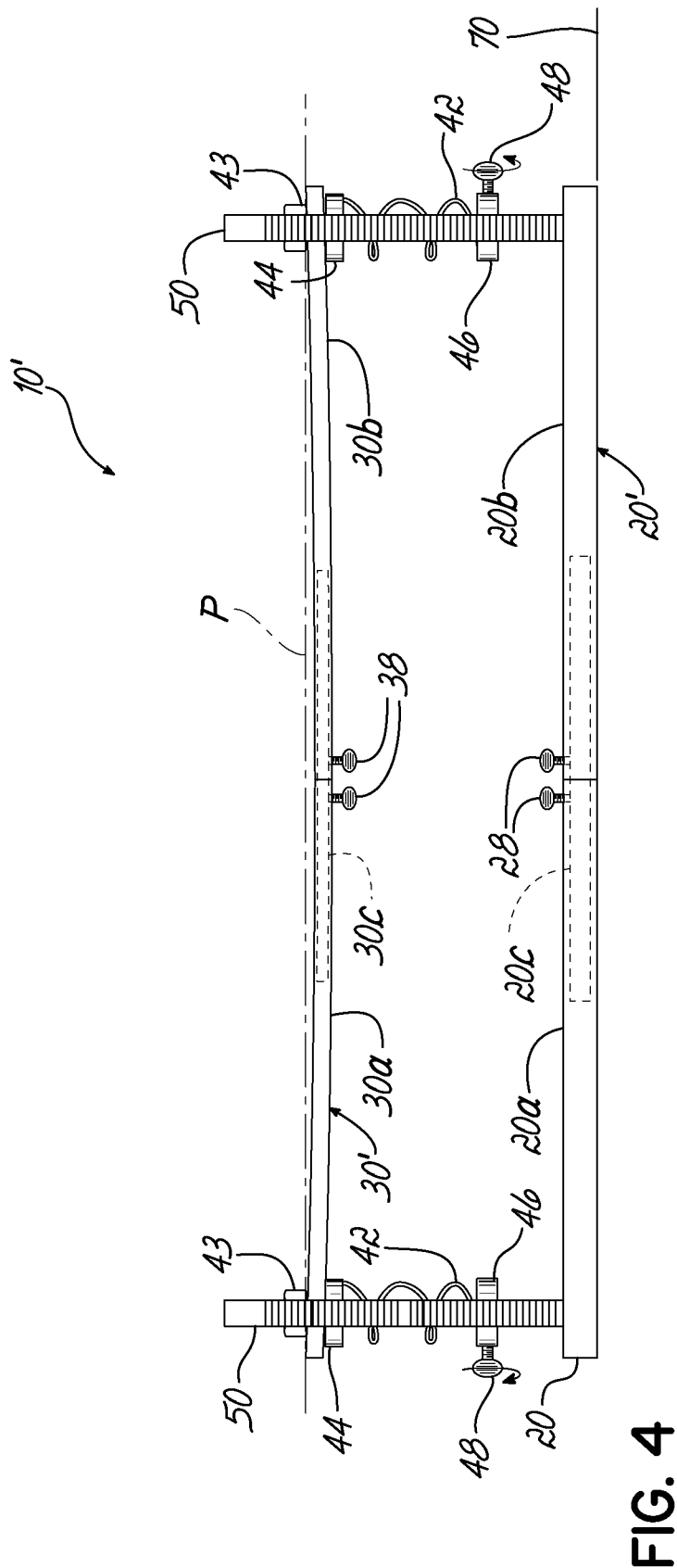
FIG. 4 is side plan view of a ride height gauge in accordance with another embodiment of the present invention.

RC cars are made in a variety of sizes, which accommodate both a range of sizes in the source vehicles they simulate as well as a variety of scales, including ⅛, 1/10 and 1/12 scale models. In order to accommodate a range of vehicle lengths, a gauge 10' according to another embodiment is shown in FIGS. 4 and 5 having expandable chassis engaging and base members 30' and 20', respectively. As shown in FIGS. 4 and 5, the expandable gauge 10' may contain any of the features and variations described above. The same reference numbers denote the same components throughout the various figures.

In the illustrated embodiment, the expandable gauge 10' includes an expandable dual telescoping chassis engaging member 30' constructed of two primary chassis engaging members 30a, 30b and an extension member 30c. Each of the primary chassis engaging members 30a, 30b includes a wing fastener 38, which tightens to fix the chassis engaging members 30a, 30b into place. When in a collapsed position, the primary chassis engaging members 30a, 30b may be in contact and the extension member 30c not visible, as shown in FIG. 4. When expanded to accommodate a larger vehicle 60', as shown in FIG. 5, the extension member 30c accommodates the center of the vehicle chassis as each of the primary chassis engaging members 30a, 30b move outward to increase the total length of the chassis engaging member. Similarly, the expandable telescoping base member 20' may also include two primary base members 20a, 20b, an extension member 20c, and wing fasteners 28 to allow for the same expansion of the base member. The extension may be variable, or the wing fasteners or other fasteners may mate with one or more apertures in the expansion members 20c, 30c that provide pre-set internal lengths for the gauge 10'.

In one embodiment, the base member 20 and the chassis engaging member 30 are single elongated members that extend the length of the gauge. It is contemplated that the base member or the chassis engaging member may instead represent smaller segments that occupy only select sections of the gauge. In an alternative embodiment, separate base members support the columns at either end of the gauge. In yet another alternative embodiment, separate chassis engaging members support the ends of the vehicle chassis at either end of the gauge. The separate base members and chassis engaging members may be connected by support members or may stand freely.

Other the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicants' invention.

What is claimed is:

1. A ride height gauge for a model vehicle having a chassis, comprising:
    a base member configured to engage a horizontal support surface; and
    a chassis engaging member resiliently biased relative to the base member and configured to move vertically relative to the base member;
    wherein a model vehicle placed upon the chassis engaging member, with the chassis of the model vehicle engaging the chassis engaging member, will lower the chassis engaging member to a position above the horizontal support surface approximately equal to the ride height of the model vehicle.

2. The ride height gauge of claim 1, wherein the chassis engaging member rests upon a plurality of resilient members that resiliently bias the chassis plate away from the base plate.

3. The ride height gauge of claim 2, wherein the resilient members comprise springs that contract in response to a model vehicle being placed upon the chassis plate.

4. The ride height gauge of claim 3, further comprising a plurality of spring columns attached to the base member, the spring columns supporting the plurality of springs.

5. The ride height gauge of claim 1, further comprising a measurement column attached to the base member, the measurement column comprising indicia marking position of the chassis engaging member above the horizontal support surface such that the measurement column indicia is configured to show a ride height of a model vehicle when placed upon the chassis engaging member.

6. The ride height gauge of claim 5, further comprising a plurality of the measurement columns, and wherein the indicia of a first measurement column is configured to show the ride height of a first end of the model vehicle and the indicia of a second measurement column is configured to show the ride height of a second end of the model vehicle placed upon the chassis engaging member.

7. The ride height gauge of claim 1, wherein the base member and the chassis engaging member are each expandable to operate at a plurality of different lengths.

8. The ride height gauge of claim 7, wherein the base member and the chassis engaging member are each telescoping.

9. The ride height gauge of claim 1, wherein the base member comprises an elongated plate that extends the full length of the ride height gauge.

10. The ride height gauge of claim 1, wherein the chassis engaging member comprises an elongated plate that extends the full length of the ride height gauge.

11. A ride height gauge for a model vehicle having a chassis and wheels supported by the chassis, comprising:
    a base member configured to engage a horizontal support surface;
    a plurality of spring columns extending vertically from the base member;
    a plurality of measurement columns extended vertically from the base member; and
    a chassis engaging member comprising a plurality of apertures, each aperture receiving one of the plurality of spring columns or one of the plurality of measurement columns;
    wherein each spring column comprises a resilient member resiliently biasing the chassis engaging member relative to the base member; and
    wherein a model vehicle placed upon the chassis engaging member, with the chassis of the model vehicle engaging the chassis engaging member, will lower the chassis engaging member until the wheels of the model vehicle contact the horizontal support surface with each of the measurement columns being configured to display a ride height of the model vehicle.

12. The ride height gauge of claim 11, wherein the base member and the chassis engaging member each comprise a plurality of telescoping sections such that the ride height gauge can be operated at a plurality of different lengths.

13. The ride height gauge of claim 11, wherein each resilient member comprises:
    a lower spring cradle configured to fixedly attach to the spring column,
    an upper spring cradle figured to move vertically along the length of the spring column, and
    a compression spring connecting the upper and lower spring cradles.

14. The ride height gauge of claim 13, wherein the height of each lower spring cradle on its respective spring column is adjustable such that the ride height gauge can be operated at a range of ride heights greater than that of the displacement range of the plurality of springs.

* * * * *